US010579342B1

(12) United States Patent
Shemer et al.

(10) Patent No.: US 10,579,342 B1
(45) Date of Patent: Mar. 3, 2020

(54) ENCAPSULATED APPLICATION TEMPLATES FOR CONTAINERIZED APPLICATION SOFTWARE DEVELOPMENT

(71) Applicant: EMC IP Holding Company LLC, Hopkinton, MA (US)

(72) Inventors: Jehuda Shemer, Kfar Saba (IL); Amit Lieberman, Kefar Saba (IL); Assaf Natanzon, Tel Aviv (IL); Kfir Wolfson, Beer Sheva (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 99 days.

(21) Appl. No.: 15/395,117

(22) Filed: Dec. 30, 2016

(51) Int. Cl.
*G06F 9/455* (2018.01)
*G06F 9/44* (2018.01)
*G06F 9/445* (2018.01)
*H04L 12/24* (2006.01)
*G06F 8/20* (2018.01)
*G06F 8/34* (2018.01)

(52) U.S. Cl.
CPC . *G06F 8/20* (2013.01); *G06F 8/34* (2013.01)

(58) Field of Classification Search
CPC . G06F 8/65; G06F 9/5077; G06F 8/71; G06F 8/61; G06F 8/60; G06F 8/658; G06F 9/45558; G06F 11/3664; G06F 8/20; G06F 9/45533; G06F 9/455; G06F 8/34; G06F 21/6218; G06F 2201/84; Y02P 90/86; G06Q 10/06; H04L 67/02; H04L 63/105; H04L 63/20; H04L 63/0428; H04L 63/08; H04L 9/3263
See application file for complete search history.

(56) References Cited

U.S. PATENT DOCUMENTS 9,015,710 B2 * 4/2015 Spivak ............... G06F 9/5055 718/1
9,760,391 B2 * 9/2017 Kiess ................. G06F 9/5072
9,886,245 B2 * 2/2018 Kotman ................. G06F 8/35
(Continued)

OTHER PUBLICATIONS

Ristic et al., An approach to the specification of user interface templates for business applications, 6 pages (Year: 2012).*
(Continued)

*Primary Examiner* — Thuy Dao
(74) *Attorney, Agent, or Firm* — Ryan, Mason & Lewis, LLP

(57) ABSTRACT

Encapsulated application templates are provided for containerized application software development. An exemplary method for managing a plurality of services in a containerized application program comprises: creating an application template of the containerized application program, the application template comprising an identifier of a current version of each of the plurality of services, dependencies of the given service with other services of the application, runtime parameters and configurations of the given service; generating a transferable platform independent self-contained machine-readable token comprising the application template; and providing the transferable platform independent self-contained machine-readable token comprising the application template to another device as a common entry point to instantiate the containerized application program.

20 Claims, 6 Drawing Sheets

(56) References Cited

U.S. PATENT DOCUMENTS

| | | | | |
|---|---|---|---|---|
| 9,952,852 | B2* | 4/2018 | Scheidel | G06F 8/61 |
| 10,095,489 | B1* | 10/2018 | Lieberman | G06F 8/36 |
| 10,318,265 | B1* | 6/2019 | To | G06F 8/61 |
| 2005/0080609 | A1* | 4/2005 | Bhaskaran | G06Q 10/04 |
| | | | | 703/22 |
| 2007/0157185 | A1* | 7/2007 | Semerdzhiev | G06F 8/61 |
| | | | | 717/148 |
| 2008/0127169 | A1* | 5/2008 | Malasky | G06F 8/61 |
| | | | | 717/174 |
| 2008/0215396 | A1* | 9/2008 | Greenstein | G06Q 10/06375 |
| | | | | 705/7.38 |
| 2012/0246645 | A1* | 9/2012 | Iikura | G06F 8/61 |
| | | | | 718/1 |
| 2014/0136480 | A1* | 5/2014 | Stofberg | G06F 17/30575 |
| | | | | 707/610 |
| 2015/0220308 | A1* | 8/2015 | Condon | G06F 8/20 |
| | | | | 717/104 |
| 2015/0293760 | A1* | 10/2015 | Alevoor | G06F 9/45558 |
| | | | | 717/169 |
| 2017/0041189 | A1* | 2/2017 | Aswathanarayana | |
| | | | | H04L 41/0806 |

OTHER PUBLICATIONS

O. Drori, Template for a System Design File Using OODPM Version 2015, 4 pages (Year: 2016).*
Lieberman et al., "GUI-Based Application Template for Containerized Application Software Development", U.S. Appl. No. 15/388,559, filed Dec. 22, 2016.

* cited by examiner

| SERVICE NAME | TYPE | VERSION | DEPENDENCIES | PARAMETER | INDEX |
|---|---|---|---|---|---|
| SHOPPING CART | DOCKER CONTAINER | 1.3 | REDIS DATABASE + RABBITMG | | |
| LOGIN SERVICE | DOCKER CONTAINER | 2.01 | POSTGRES DATABASE | | |
| | | | | | |
| | | | | | |

ENCAPSULATED APPLICATION TEMPLATES FOR CONTAINERIZED APPLICATION SOFTWARE DEVELOPMENT

CROSS-REFERENCE TO RELATED APPLICATIONS

The present application is related to U.S. patent application Ser. No. 15/388,559, filed Dec. 22, 2016 (now U.S. Pat. No. 10,095,489), entitled "GUI-Based Application Template for Containerized Application Software Development," incorporated by reference herein in its entirety.

FIELD

The field relates generally to software development, and more particularly, to a template for application software development.

BACKGROUND

Computer applications used in large-scale networks are evolving from a monolithic architecture that provides applications for use by many users (e.g., web applications) to a microservice architecture that features many small components. This allows applications to be easily scaled by providing new or updated components without requiring rewrite or modification of the entire application. However, as the number of components or services in an application increases, the management overhead regarding fixing problems and integrating changes in the overall applications greatly increases, as well.

During the development of application software, developers and programmers fix bugs and Quality Assurance (QA) engineers verify the fixes, often rejecting or opening more bugs. This can be a highly iterative process with multiple versions created by the developers until the software quality is satisfactory. In complex applications, a fix applied by a developer may need to be performed and applied to multiple components of the system, requiring the QA engineer and developer to manually configure and replace multiple parts of the system in order to reproduce issues and verify fixes. This process is time consuming, and also error prone in that it creates scenarios where bugs are not reproduced by developers, or the configuration verified by the QA is not the correct one.

SUMMARY

Illustrative embodiments of the disclosure provide encapsulated application templates for containerized application software development. In one exemplary embodiment of the disclosure, a method for managing a plurality of services in a containerized application program comprises: creating an application template of the containerized application program, the application template comprising an identifier of a current version of each of the plurality of services, dependencies of the given service with other services of the application, runtime parameters and configurations of the given service; generating a transferable platform independent self-contained machine-readable token comprising the application template; and providing the transferable platform independent self-contained machine-readable token comprising the application template to another device as a common entry point to instantiate the containerized application program.

Advantageously, illustrative embodiments of the disclosure provide improved techniques for containerized application software development. These and other features and advantages of the present disclosure will become more readily apparent from the accompanying drawings and the following detailed description.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. In some embodiments of the disclosure, encapsulated application templates are provided for containerized application software development. While one or more embodiments of the disclosure are illustrated using container-based techniques for deploying applications, other infrastructures can be employed, such as virtual machines, as would be apparent to a person of ordinary skill in the art.

A need exists for improved application software development techniques that employ application templates, comprising an application configuration and running state, to allow new instances of the application to be created having substantially the same configuration and run state. A further need exists for transferable representations of such application templates.

In one or more embodiments of the disclosure, techniques are provided for managing a plurality of services in a containerized application program. In certain embodiments, an application template of a containerized application program may comprise an identifier of a current version of each of the services used by the application, dependencies of each service with other services of the application, runtime parameters and configurations of each service. In at least one embodiment of the disclosure, a transferable platform independent self-contained machine-readable token comprising the application template is generated and that can be passed electronically to another device to use as a common entry point to instantiate the containerized application program.

Figure 1:
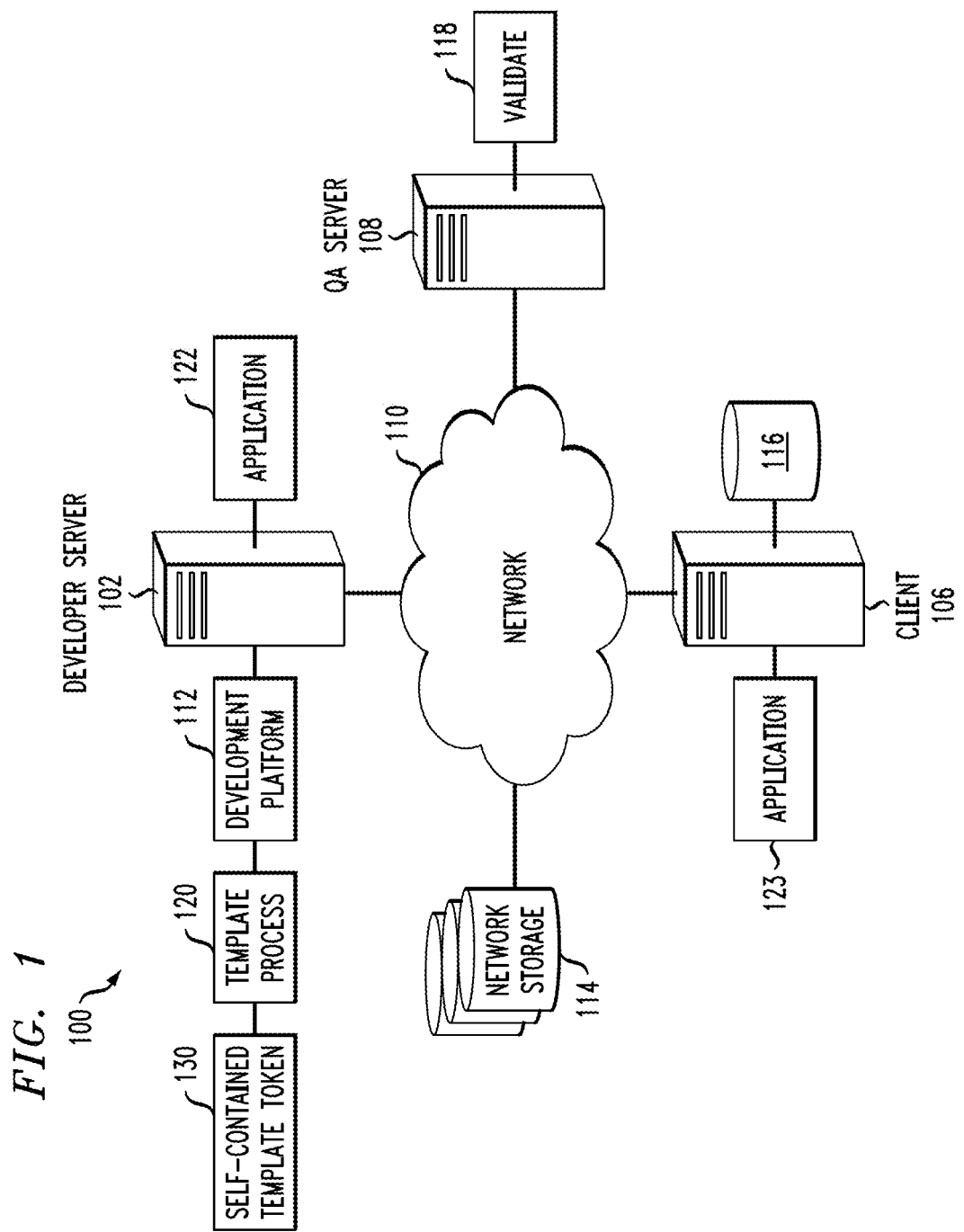
FIG. 1 illustrates a large-scale network implementing an application developer GUI interface, according to one embodiment of the disclosure.

The example embodiment of FIG. 1 illustrates a computer network system 100 that implements one or more embodiments of a GUI interface for application software developers, according to one embodiment of the disclosure. In system 100, a developer server computer 102 is used to author or modify application software 122. Application 122 may represent any computer program that is capable of being executed on a client computer to perform certain tasks. The client may be any appropriate computer platform, such as a desktop computer, notebook/laptop, mobile device, game console, smart device, Internet-enabled appliance, and so on. Once the application is at a certain stage of development, such as an alpha or pre-release stage, it is typically sent to a QA engineer operating a QA server 108. The QA server executes certain validation tests 118 to test and validate the application program. Typically one or more bugs are detected by the QA programs, and the application software is then fixed or sent back to the developer for fixing. In complicated programs or large-scale distributed systems with many interoperating parts, this debugging process between the developer and QA personnel may be a highly iterative process involving several steps of bug detection, bug fixing, test/validation, and re-test. Data regarding the application development and debug/fix process may be stored in development logs kept in local or network storage, such as storage devices 114.

Once the application is ready to be released in a client deployment, either as a production version or trial (beta) version, it is executed on a client computer 106 in a released version 123. If any bugs are reported from clients in the field, they must be fixed or patched and these patches then go through the same developer-QA bug fix cycle.

The network server computers 102 and 108 are coupled directly or indirectly in various embodiments to the various clients 106, storage devices 114, and other resources through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud-computing platform.

The application programs developed within system 100 may be, for example, server-side applications, client side applications and/or mobile applications.

As shown in FIG. 1, network system 100 includes a server 102 that executes an encapsulated template process (or module) 120 (discussed further below in conjunction with FIG. 2) with a functional component that improves the development-QA cycle interaction by using enhanced copy data management with a purpose built graphical user interface (GUI or UI) for serving that process. This component and UI interface is configured in one or more embodiments to overcome the error prone and slow processes of present software development and provides an effective method that features automation over manual processes in a robust system that reduces human errors over current developer/QA interaction cycles.

In certain embodiments of the disclosure, the application template may not be very large in size, and can be, for example, a few kilobytes (KBs) of data. In at least one embodiment of the disclosure, an encapsulated uniform resource locator (URL) is created to store the template coded in the URL (for example, using zip compression and base64 encoding) to provide a fully encapsulated application description in a URL. The resulting blob can be a token or URL parameter part of the URL.

As noted above, one or more embodiments of the disclosure employ a self-contained template token 130 that can be provided to another device as a common entry point to instantiate a given containerized application program. In one or more embodiments of the disclosure, the self-contained template token 130 is transferable, platform independent and machine-readable. In this manner, the application template can then be more easily shared, copy/pasted and transferred between users and systems, including unrelated systems.

As discussed further below in conjunction with the embodiment of FIG. 6, an exemplary embodiment of a self-contained template token 130 may be generated by compressing and/or encoding the application template. In one or more embodiments of the disclosure, the exemplary self-contained template token 130 can be embodied as, for example, a uniform resource locator, a two-dimensional scan code (such as a QR (Quick Response) code) and an HTTP cookie.

In an embodiment of the disclosure, template process 120 utilizes modern container techniques to provide a UI-based solution that allows developers and QA to manipulate and exchange application configurations in an efficient and robust manner. In general, containerization involves encapsulating an application in a container with its own operating environment, in contrast to launching an entire virtual machine for each application. In certain embodiments, each application may be deployed in its own container that runs directly on the server plus a single, shared instance of the operating system. For a container-based embodiment of FIG. 1, multiple isolated systems are run on a single control host and access a single kernel. The application containers hold the components such as files, environment variables and libraries necessary to run the developed application.

For a more detailed discussion of techniques for generating application templates, and for using such application templates as a uniform entry point for different users to access and manipulate the application program components, see, U.S. patent application Ser. No. 15/388,559, filed Dec. 22, 2016 (now U.S. Pat. No. 10,095,489), entitled "GUI-Based Application Template for Containerized Application Software Development," incorporated by reference herein in its entirety.

Figures 2, 3:
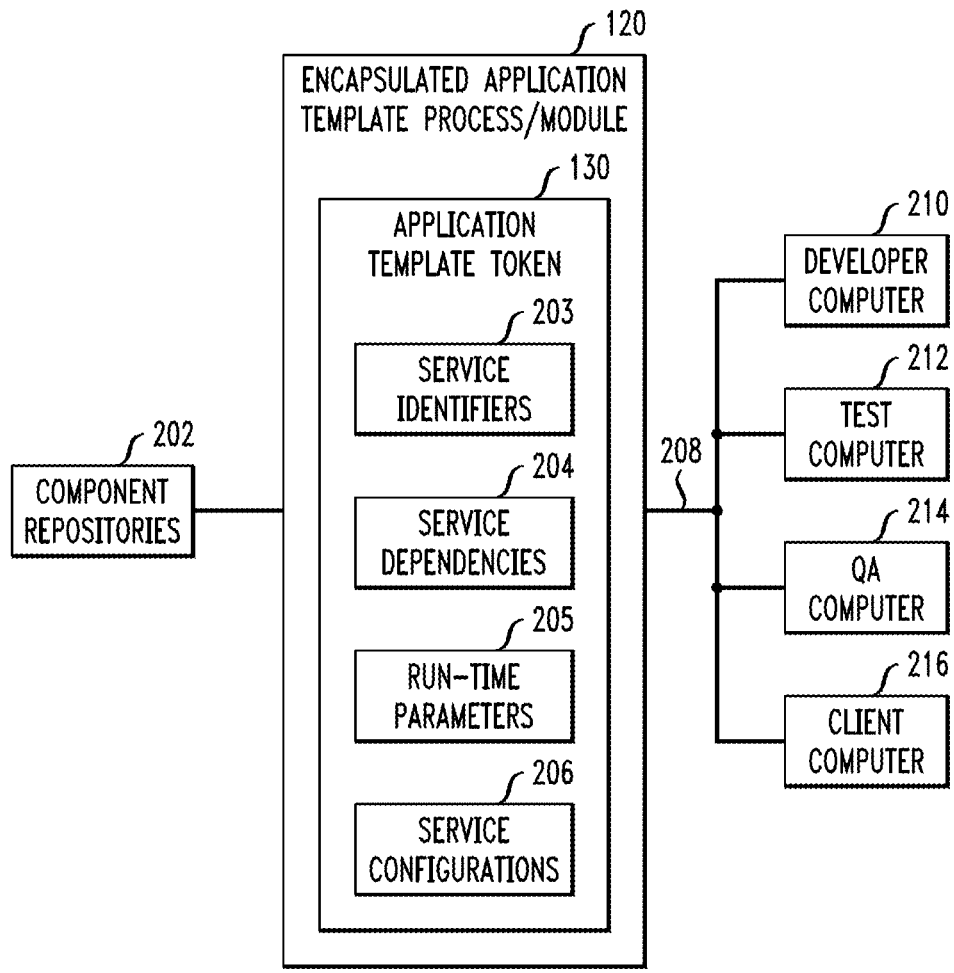
FIG. 2 illustrates functional components of an encapsulated application template process or module, according to one embodiment of the disclosure.
FIG. 3 illustrates a template database, according to one embodiment of the disclosure.

The example embodiment of FIG. 2 illustrates functional components of an encapsulated application template process (or module) 120, according to one embodiment of the disclosure. One or more of the functional components shown in FIG. 2 can be implemented using Platform-as-a-Service (PaaS) techniques, as would be apparent to a person of ordinary skill in the art. The platform independent aspects of the disclosed self-contained template tokens 130 allow the self-contained template token 130 to be received and processed by various PaaS implementations and end-user devices that can run applications, such as Android™ devices. Generally, a given self-contained template token 130 provides an indication to the PaaS system of the components that are needed to instantiate a given application, including the necessary resources and service dependencies.

As shown in the example embodiment of FIG. 2, the application template process 120 is functionally coupled to one or more component repositories 202 that can be local or remote with respect to the host of the application template process 120. The component repositories 202 comprise, for example, components, virtual machines and/or services, such as Docker Repositores (public, private), VMware™ marketplace, Database websites downloads, and Linux component repositories. In addition, the encapsulated application template process 120 is functionally coupled through network connections 208 to other developer computers 210, test computers 212, QA computers 214, and/or a client computer 216 that view the application instantiated by the PaaS system. Generally, a user can import the template token 130 into a system (e.g., as a read only blob). If the user manipulates the imported template token 130, it can be saved as a new self-contained template token 130.

The exemplary application template process 120 processes a self-contained application template token 130 in one or more embodiments to instantiate the corresponding application for one or more users or devices. The exemplary application template process 120 comprises service identifiers 203 (e.g., product names and version numbers or other public use names) identifying the current version of each service used by the application; service dependencies 204 identifying dependencies of each service with other services of the application; run-time parameters 205 and service configurations 206 of each service.

In certain embodiments, on a containerized application containing multiple microservices, there may be several components each maintaining its own version. For example, a word processor application may include many functional modules, such as for text I/O, formatting, spellcheck, dictionary, drawing graphics, table entry, and so on. In the example, as the application is developed, each module may go through multiple versions, in addition, the modules must be tested together so that it is assured that the application as a whole functions correctly. In some embodiments, the term "service" or "microservice" may denote functional unit or subunit of an application program that is capable of being authored independently of the others with respect to version number and validation tests, among other distinctions, but that may be dependent upon or interact with any other component in the application program.

In at least one embodiment of the disclosure, template process 120 provides each deployed application with an application template token 130 comprising versions of each component in the system, including their dependencies and infrastructure services required during runtime. For each application or application microservice, the template process 120 also stores the current version of the component.

In some embodiments, applications may be categorized by type, such as small, medium and large-scale applications. In certain embodiments, small-scale applications may be relatively small standalone modules that do not contain many, if any submodules, and may be limited with regard to target binary size, client device type, and so on. In some embodiments, large-scale applications may comprise large software programs or infrastructure level applications, such as large database programs, and the like. In further embodiments, for large-scale applications for infrastructure services, the system will also store the configuration and version as it might be upgraded/modified as part of the fix. In other embodiments, a medium-scale or other granularity application may be of any scale in between that of small and large. In addition embodiments, component runtime parameters and configuration may be also stored so that the application can be run with the same conditions.

In an embodiment of the disclosure, the self-contained template token 130 is used to populate and/or partially create a user interface displayed to the developer, QA, and or client personnel as appropriate. The example embodiment of FIG. 3 illustrates a template database 300. As shown in FIG. 3, table 300 defines an example table representing database entries populated from an application template, according to one embodiment of the disclosure. Table 300 includes a number of fields for an application including the name of each relevant service (subroutine, module, etc.), type (e.g., large, medium, small-scale), and current version number for each service. The application name can be any alphanumeric name or code that uniquely identifies the entire application program. The type can be specified by an appropriate code, and the version can be a sequential number or alphanumeric code. Other data items associated with each named service includes the dependencies among the services. Dependencies can specify I/O relationships, data definitions, and other relationships between a service and any other service of the application. Other fields can be included, such as runtime parameters that may be defined for each service and/or index fields to provide additional definitions for each service, and other possible data elements. The example table of FIG. 3 shows two illustrative services, namely, a shopping cart and a login service and some representative field definitions. FIG. 3 is provided for purposes of illustration only and many other formats and content definitions can be provided.

In an embodiment of the disclosure, the application template token 130 is created as part of the runtime infrastructure without need for user intervention. In this way, the application state can be automatically created without human error. The application template token 130 is updated in one or more embodiments as services are added or deleted from the application, and any dependencies, parameters, etc. are updated automatically as services or application configuration is changed. The application template token 130 may be stored in any appropriate shared storage location, such as network storage 114. As noted above, the application template is not very large in size in some embodiments, and is usually on the order of only a few KBs of data and therefore can be stored in a self-contained template token 130 and provided to other downstream processes, users and/or devices.

Once the self-contained template token 130 is created and stored, it can be accessed (e.g., viewed) in one or more embodiments by the different entity computers as shown in FIG. 2. With respect to using the templates, references to the stored template, both encapsulated (or containerized) or not, provide a way of communicating applications. In an embodiment of the disclosure, the template process 120 includes a GUI interface that creates or hosts a client computer user interface that allows users (e.g., developers, QA, clients, etc.) to access and use the instantiated template. Any appropriate UI format and I/O or command interface may be used.

Figure 4:
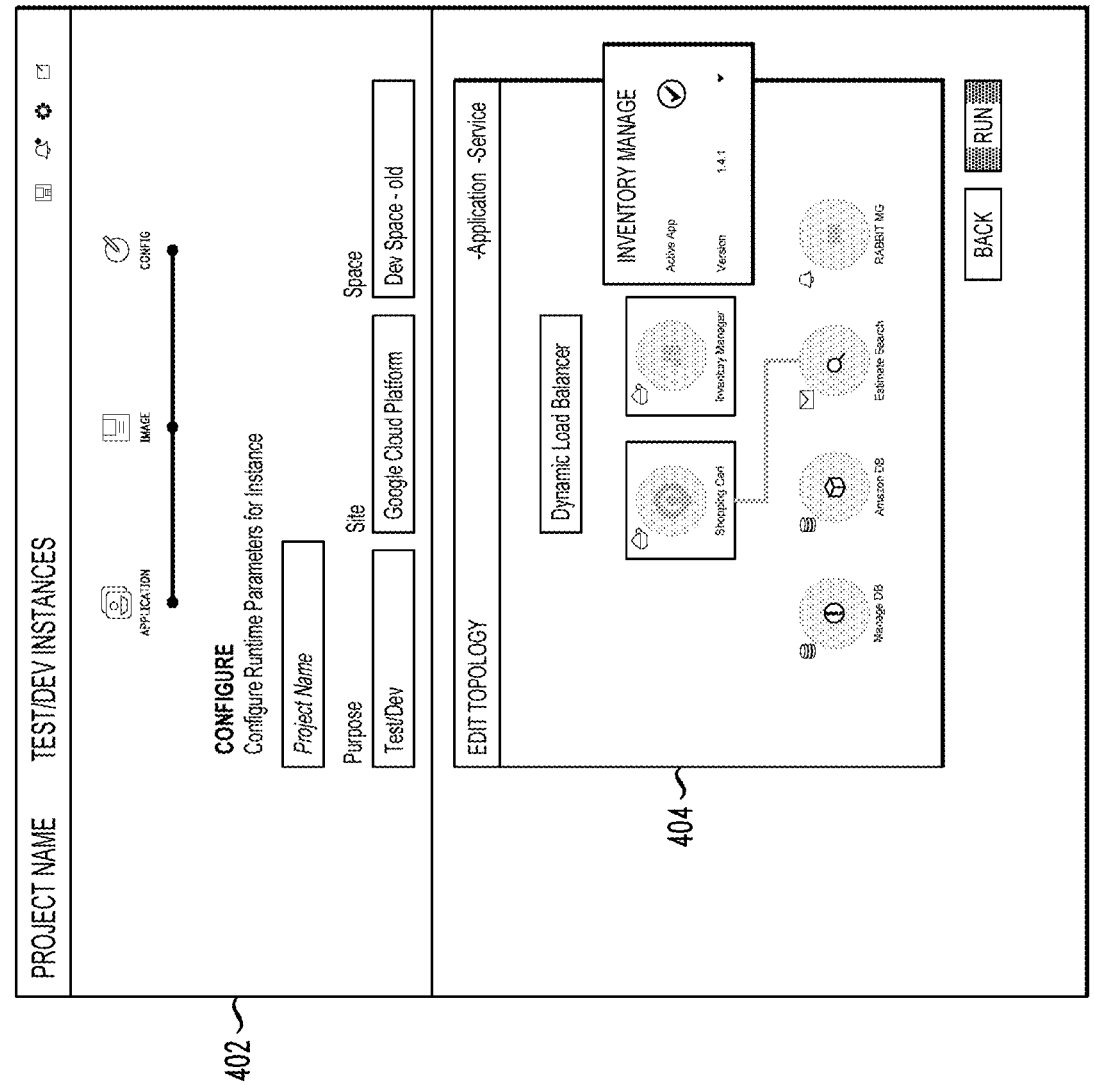
FIG. 4 illustrates an example GUI screen providing access to an application template, according to one embodiment of the disclosure.

The example embodiment of FIG. 4 illustrates an example GUI screen providing access to an application template. FIG. 4 shows an example UI for running and configuring an application instance from a template. The UI 400 may include any number of display areas showing attributes related to the template being viewed, such as the template definitions and code, as well as an application map that shows the layout of the service or subroutine for the template as it fits into the actual application itself. For the example of FIG. 4, UI 400 includes a configuration window 402 that specifies or allows the user to view items for the selected project, such as the purpose (e.g., test/development), the site (e.g., cloud), and the space, along with other possible configuration options. A topography display area 404 shows the relationship among different modules of the project in a hierarchical relationship manner. FIG. 4 is intended to be for purposes of example and illustration only, and any other format and content layout may be possible.

In one or more embodiments of the disclosure, the template may be accessed directly through entity computer web browsers (for a web-hosted implementation), or it may be transmitted among users such as through e-mail. The template may also be linked to a bug tracking system so that it may be used to provide data regarding found and fixed bugs.

With respect to actual application development, the template can be used to upgrade existing applications to new versions and fix existing application configuration issues. It can also be used to compare between application configurations to find differences between different configurations and deployments. The template can also be used to provide certain system-wide benefits, such as providing preconfigured demo applications, or creating catalogs of ready applications with issues, features, or other properties.

With regard to the user interface for manipulating software versions, the uses of the references to applications can all be exposed via the UI. The UI can also be used to manipulate a template after it is imported. In an embodiment of the disclosure, the entities (e.g., developer and QA) access the template through a defined entry point, and can manipulate the versions of the components from the user interface before deploying the application for use by clients.

Figure 5:
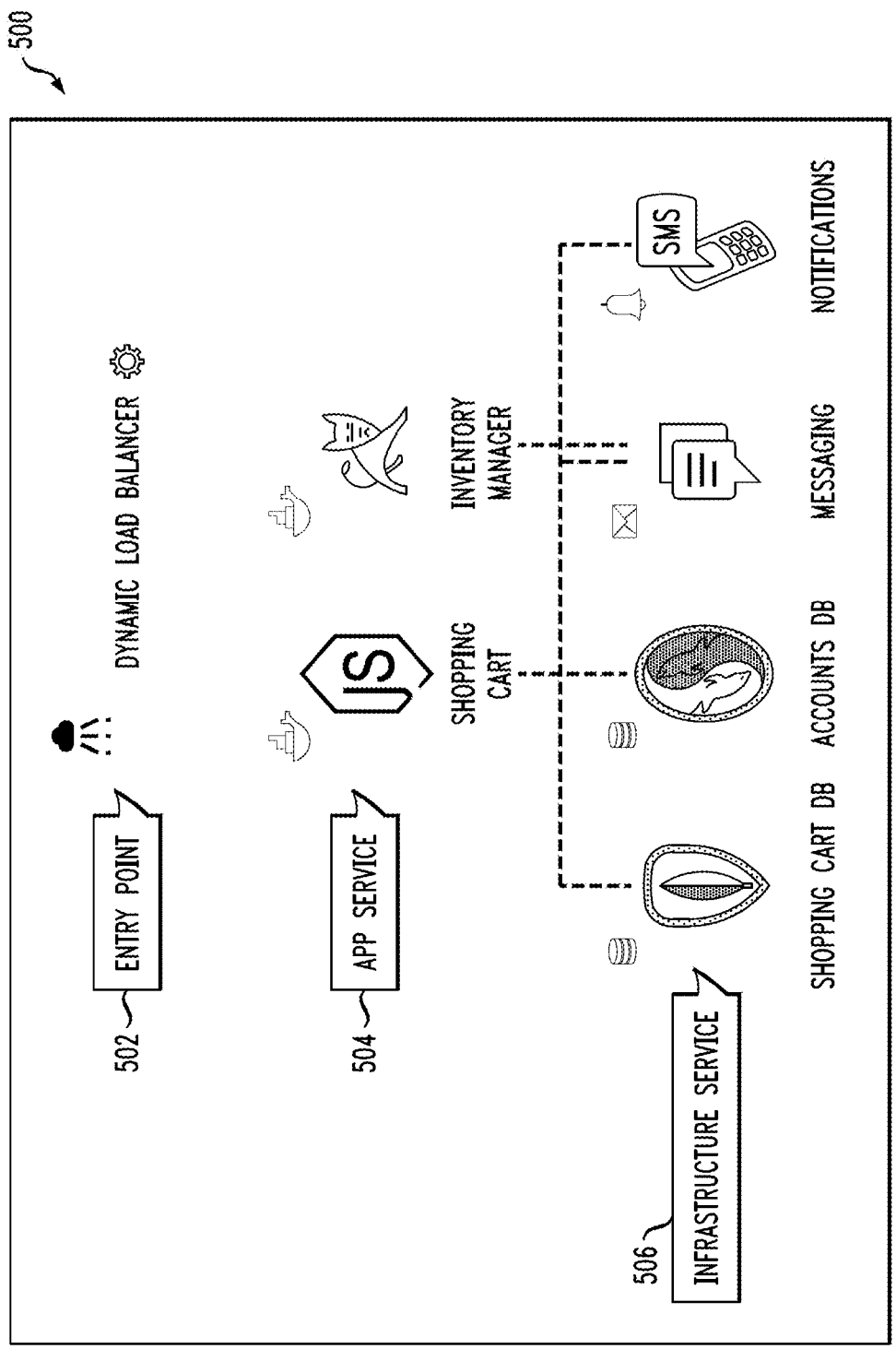
FIG. 5 illustrates a graphical representation of an application template, according to one embodiment of the disclosure.

The example embodiment of FIG. 5 illustrates a graphical representation of an application template. FIG. 5 illustrates topography of the UI showing an entry point 502 to the specific component or service (e.g., Dynamic Load Balancer), and the application 504 using the component, as well as the infrastructure service 506 using the application. In FIG. 5, the entry point 502 provides network mapping to denote which services expose what ports to the outside world of application users. The example shows a load balancer configuration. The application services 504 comprise containers containing applicative code of the application. The infrastructure services 506 are example services, such as databases, e-mail services, messaging, and so on that the application services 504 are dependent on in order to run.

The example of FIG. 5 illustrates a certain level of granularity of the elements for the application template, such as on the scale of component to application to infrastructure. It should be noted that other hierarchies or granularities might also be possible, such as subroutine to routine to program, and so on.

The entry point 502 can be accessed by an appropriate HTTP link accessible to all of the entities through their respective web browser. This access may be linked through a drop-down (or similar menu) interface that shows the latest version number of the application or service, and invokes the UI shown in FIG. 4 or FIG. 5. In this manner, the system defines a UI-driven store and share system containing application templates that defines a database storing components and services of an application, exposes the application elements to different users in the system, and provides a uniform entry point for the different users to access and manipulate the application program components.

Figure 6:
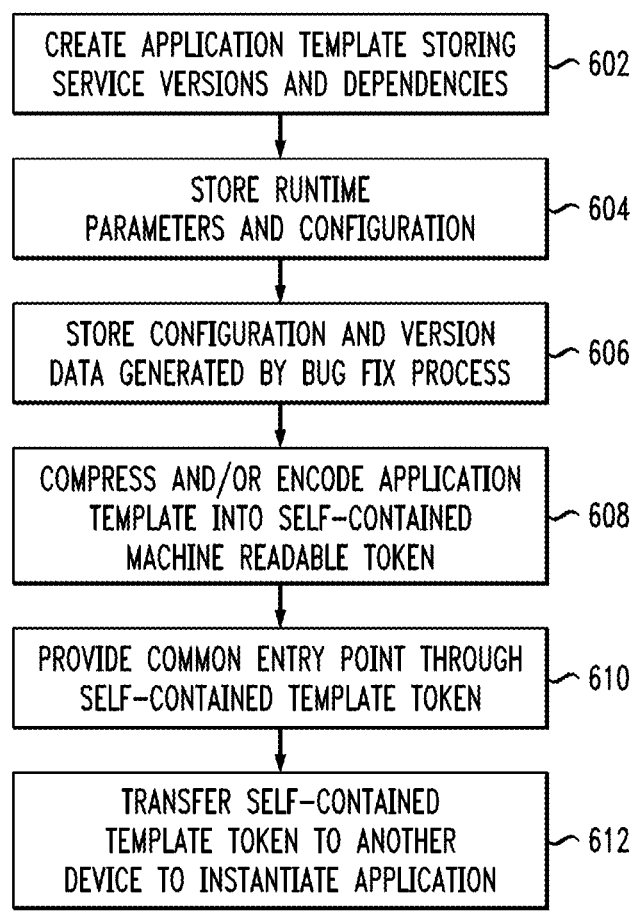
FIG. 6 is a flowchart illustrating a method of providing and using an application template, according to one embodiment of the disclosure.

The example embodiment of FIG. 6 is a flowchart illustrating a method of providing and using an application template. As shown in FIG. 6, the process starts in one or more embodiments by creating an application template storing the current versions of each service (component) within the application including their dependencies to other services in the application, block 602. The template also stores runtime parameters and configuration information for the services, block 604. For certain applications, such as infrastructure services, the template can also store configuration and version data created by any bug fix or revisioning processes, block 606. The template is compressed and/or encoded in the example embodiment of FIG. 6 during step 608 into a self-contained machine readable token 130. For example, zip-based compression and/or text-based encoding can be employed to represent the description in a URL or QR code, or another machine-readable format. Thus, a user can follow the URL link or scan the QR code to instantiate the application (without having to depend on another system to obtain the stored application template).

The template is exposed to different entities in the overall software environment. For the embodiment of FIG. 6, this is performed by providing a common entry point to the template through the self-contained machine readable token 130, during step 610. Once a template token has been imported into a system, access and manipulation of the imported template may be optionally controlled by certain role-based access restrictions. The self-contained machine readable token 130 is transferred, during step 610, to another device to instantiate the application.

As described herein, the application template and UI interface in some embodiments provide several significant benefits over present application software development methods. These include increased efficiency of the test and development process and automatic deployment of modified application templates, which greatly saves on manual configuration time. It also provides increased quality of the product, as there is less opportunity to get configurations wrong as they are saved and exchanged via an automated tool.

Thus, one or more embodiments of the disclosure provide techniques for managing a plurality of services in a containerized application program. An application template of a containerized application program comprises an identifier of a current version of each of the services used by the application, dependencies of each service with other services of the application, runtime parameters and configurations of each service. In at least one embodiment of the disclosure, a transferable platform independent self-contained machine-readable token comprising the application template is generated and provided to another device as a common entry point to instantiate the containerized application program.

In various embodiments of the disclosure, the generated transferable platform independent self-contained machine-readable tokens 130 can be emailed to other people or sent by another form of communication, such as Instant Message; embedded in the application configuration in a bug tracking system; placed in questions and answers in technical help sites, such as stack overflow; copied between management systems; stored in personal catalogs, playlists and/or other bookmarks without dependencies; sent as a demonstration of a given application; sent as topology and/or application updates; embedded in html forms and cookies; and shared using QR codes or similar mechanisms, as would be apparent to a person of ordinary skill in the art. If a given implementation requires security, the blob can optionally be signed and/or encrypted, as would be apparent to a person of ordinary skill in the art.

The foregoing applications and associated embodiments of the disclosure should be considered as illustrative only, and numerous other embodiments can be configured using the techniques disclosed herein, in a wide variety of different applications.

It should also be understood that the disclosed containerized application software development techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed containerized application software development techniques may be implemented using one or more processing platforms. One or more of the processing modules or other components may therefore each run on a computer, storage device or other processing platform element. A given such element may be viewed as an example of what is more generally referred to herein as a "processing device." A processing device can be physical or virtual and the process steps described herein may be executed across one or more physical or virtual processing devices. In addition, a given virtual device can be mapped to a portion of a physical device.

Figure 7:
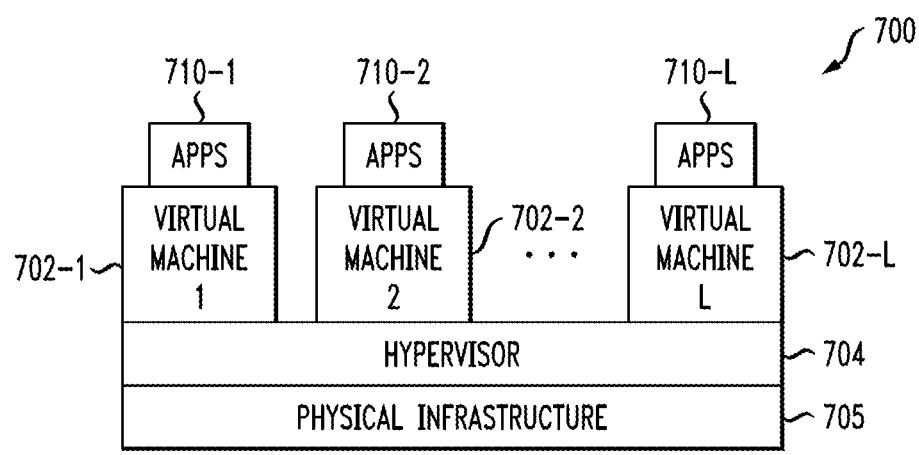
FIG. 7 illustrates an exemplary processing platform that may be used to implement at least a portion of one or more embodiments of the disclosure comprising a cloud infrastructure.

Referring now to FIG. 7, one possible processing platform that may be used to implement at least a portion of one or more embodiments of the disclosure comprises cloud infrastructure 700. The cloud infrastructure 700 in this exemplary processing platform comprises virtual machines (VMs) 702-1, 702-2, . . . 702-L implemented using a hypervisor 704. The hypervisor 704 runs on physical infrastructure 705. The cloud infrastructure 700 further comprises sets of applications 710-1, 710-2, . . . 710-L running on respective ones of the virtual machines 702-1, 702-2, . . . 702-L under the control of the hypervisor 704.

The cloud infrastructure 700 may encompass the entire given system or only portions of that given system, such as one or more of client, servers, controllers, or computing devices in the system.

Although only a single hypervisor 704 is shown in the embodiment of FIG. 7, the system may of course include multiple hypervisors each providing a set of virtual machines using at least one underlying physical machine.

An example of a commercially available hypervisor platform that may be used to implement hypervisor 704 and possibly other portions of the system in one or more embodiments of the disclosure is the VMware® vSphere™ which may have an associated virtual infrastructure management system, such as the VMware® vCenter™. The underlying physical machines may comprise one or more distributed processing platforms that include storage products, such as VNX™ and Symmetrix VMAX™, both commercially available from Dell EMC of Hopkinton, Mass. A variety of other storage products may be utilized to implement at least a portion of the system.

In some embodiments of the disclosure, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments of the disclosure a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of system. Containers may be used in combination with other virtualization infrastructure such as virtual machines implemented using a hypervisor.

Figure 8:
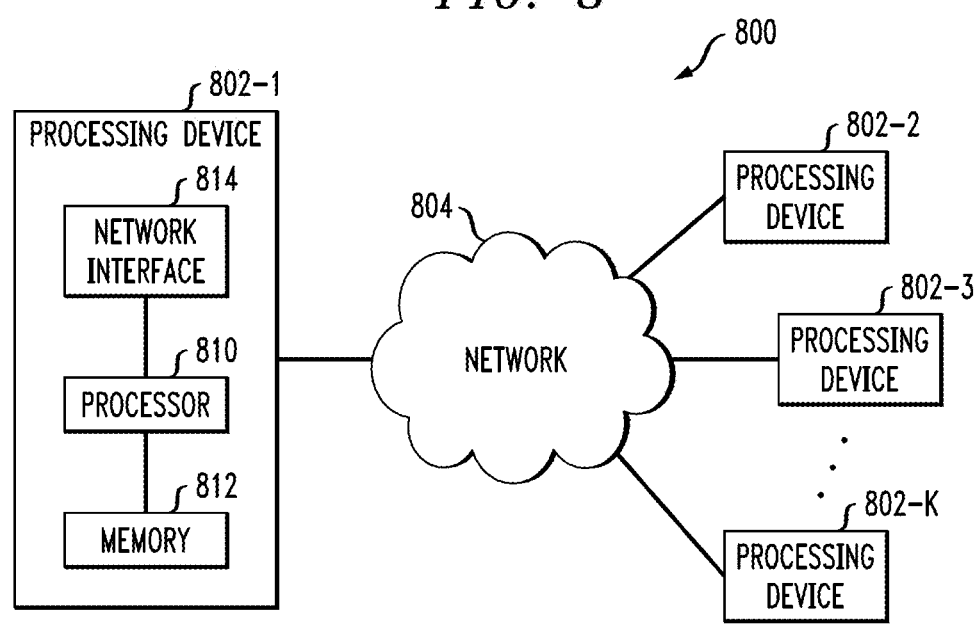
FIG. 8 illustrates another exemplary processing platform that may be used to implement at least a portion of one or more embodiments of the disclosure.

Another example of a processing platform is processing platform 800 shown in FIG. 8. The processing platform 800 in this embodiment of the disclosure comprises at least a portion of the given system and includes a plurality of processing devices, denoted 802-1, 802-2, 802-3, . . . 802-K, which communicate with one another over a network 804. The network 804 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 802-1 in the processing platform 800 comprises a processor 810 coupled to a memory 812. The processor 810 may comprise a microprocessor, a microcontroller, an application specific integrated circuit (ASIC), a field programmable gate array (FPGA) or other type of processing circuitry, as well as portions or combinations of such circuitry elements, and the memory 812, which may be viewed as an example of a "computer program product" having executable computer program code embodied therein, may comprise random access memory (RAM), read only memory (ROM) or other types of memory, in any combination.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 7 or 8, or each such element may be implemented on a separate processing platform.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a tangible recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. In many embodiments, a processor may be physical or virtual processor. In some embodiments, a virtual processor may executed on a portion of or across virtual or physical processors.

Also, it should again be emphasized that the above-described embodiments of the disclosure are presented for purposes of illustration only. Many variations and other alternative embodiments may be used. For example, the disclosed containerized application software development techniques are applicable to a wide variety of other types of communication systems, storage systems and processing devices. Accordingly, the particular illustrative configurations of system and device elements detailed herein can be varied in other embodiments of the disclosure. These and numerous other alternative embodiments of the disclosure within the scope of the appended claims will be readily apparent to those skilled in the art.

What is claimed is:

1. A computer-implemented method for managing a plurality of services in a containerized application program, comprising:
    creating an application template of said containerized application program, wherein a given service of the plurality of services has a respective version representing a state of development of the given service, wherein said application template comprises: (i) an identifier of a current version of each of said plurality of services, wherein each of said plurality of services are identified by a service name and wherein said current version for at least one of said plurality of services identifies one of a plurality of versions of said at least one service, (ii) dependencies of the given service with other services of the application, (iii) runtime parameters and (iv) configurations of the given service, wherein the identifiers, dependencies, runtime parameters and configurations are used to instantiate the given service to the respective version;
    generating a transferable platform independent self-contained machine-readable token comprising the application template; and
    providing said transferable platform independent self-contained machine-readable token comprising the application template to another device as a common entry point to instantiate the containerized application program.

2. The method of claim 1 wherein the entities comprise one or more of a developer, a quality assurance personnel, and a client user of the containerized application program.

3. The method of claim 1 wherein said transferable platform independent self-contained machine-readable token comprising the application template comprises one or more of a uniform resource locator, a two-dimensional scan code and an HTTP cookie.

4. The method of claim 1 wherein each service comprises a software routine executed as part of the containerized application program and created independently of the other services.

5. The method of claim 4 wherein the application template is created during runtime of the containerized application program as part of a runtime infrastructure of a system containing the containerized application program.

6. The method of claim 1 wherein the given service is updated as part of a bug-fix process and the application template is automatically updated with new version, configuration, and dependency information during runtime of the bug-fix process.

7. The method of claim 1 wherein the generating comprises one or more of compressing and encoding the application template to generate said transferable platform independent self-contained machine-readable token.

8. A computer program product for managing a plurality of services in a containerized application program, comprising a non-transitory machine-readable storage medium having encoded therein executable code of one or more software programs, wherein the one or more software programs when executed by at least one processing device perform the following steps:
    creating an application template of said containerized application program, wherein a given service of the plurality of services has a respective version representing a state of development of the given service, wherein said application template comprises: (i) an identifier of a current version of each of said plurality of services, wherein each of said plurality of services are identified by a service name and wherein said current version for at least one of said plurality of services identifies one of a plurality of versions of said at least one service, (ii) dependencies of the given service with other services of the application, (iii) runtime parameters and (iv) configurations of the given service, wherein the identifiers, dependencies, runtime parameters and configurations are used to instantiate the given service to the respective version;
    generating a transferable platform independent self-contained machine-readable token comprising the application template; and
    providing said transferable platform independent self-contained machine-readable token comprising the application template to another device as a common entry point to instantiate the containerized application program.

9. The computer program product of claim 8 wherein the entities comprise one or more of a developer, a quality assurance personnel, and a client user of the containerized application program.

10. The computer program product of claim 8 wherein said transferable platform independent self-contained machine-readable token comprising the application template comprises one or more of a uniform resource locator, a two-dimensional scan code and an HTTP cookie.

11. The computer program product of claim 8 wherein each service comprises a software routine executed as part of the containerized application program and created independently of the other services.

12. The computer program product of claim 8 wherein the given service is updated as part of a bug-fix process and the application template is automatically updated with new version, configuration, and dependency information during runtime of the bug-fix process.

13. The computer program product of claim 8 wherein the generating comprises one or more of compressing and encoding the application template to generate said transferable platform independent self-contained machine-readable token.

14. A system for managing a plurality of services in a containerized application program, comprising:
    a memory; and
    at least one hardware device, coupled to the memory, operative to implement the following steps:
    creating an application template of said containerized application program, said application template comprising an identifier of a current version of each of said plurality of services, wherein a given service of the plurality of services has a respective version representing a state of development of the given service, wherein said application template comprises: (i) an identifier of a current version of each of said plurality of services, wherein each of said plurality of services are identified by a service name and wherein said current version for at least one of said plurality of services identifies one of a plurality of versions of said at least one service, (ii) dependencies of the given service with other services of the application, (iii) runtime parameters and (iv) configurations of the given service, wherein the identifiers, dependencies, runtime parameters and configurations are used to instantiate the given service to the respective version;

generating a transferable platform independent self-contained machine-readable token comprising the application template; and providing said transferable platform independent self-contained machine-readable token comprising the application template to another device as a common entry point to instantiate the containerized application program.

15. The system of claim 14 wherein the entities comprise one or more of a developer, a quality assurance personnel, and a client user of the containerized application program.

16. The system of claim 14 wherein said transferable platform independent self-contained machine-readable token comprising the application template comprises one or more of a uniform resource locator, a two-dimensional scan code and an HTTP cookie.

17. The system of claim 14 wherein each service comprises a software routine executed as part of the containerized application program and created independently of the other services.

18. The system of claim 17 wherein the application template is created during runtime of the containerized application program as part of a runtime infrastructure of a system containing the containerized application program.

19. The system of claim 14 wherein the given service is updated as part of a bug-fix process and the application template is automatically updated with new version, configuration, and dependency information during runtime of the bug-fix process.

20. The system of claim 14 wherein the generating comprises one or more of compressing and encoding the application template to generate said transferable platform independent self-contained machine-readable token.

* * * * *